US012808400B2

(12) United States Patent
Gueltekin et al.

(10) Patent No.: US 12,808,400 B2
(45) Date of Patent: Nov. 24, 2026

(54) METHOD AND DEVICE FOR FASTENING A COMPONENT TO A SUBSTRATE

(71) Applicant: Hilti Aktiengesellschaft, Schaan (LI)

(72) Inventors: Furkan Gueltekin, Buchs SG (CH); Marc Barrafon Gomez, Zurich (CH); Guenter Domani, Weissensberg (DE)

(73) Assignee: Hilti Aktiengesellschaft, Schaan (LI)

( * ) Notice: Subject to any disclaimer, the term of this patent is extended or adjusted under 35 U.S.C. 154(b) by 102 days.

(21) Appl. No.: 18/699,999

(22) PCT Filed: Nov. 17, 2022

(86) PCT No.: PCT/EP2022/082254
§ 371 (c)(1),
(2) Date: Apr. 10, 2024

(87) PCT Pub. No.: WO2023/099231
PCT Pub. Date: Jun. 8, 2023

(65) Prior Publication Data

US 2025/0237253 A1 Jul. 24, 2025

(30) Foreign Application Priority Data

Nov. 30, 2021 (EP) .................................... 21211270

(51) Int. Cl.
*F16B 15/06* (2006.01)
*E04B 1/76* (2006.01)

(52) U.S. Cl.
CPC ............ *F16B 15/06* (2013.01); *E04B 1/7629* (2013.01)

(58) Field of Classification Search
CPC ........ B25C 1/188; E04B 1/7629; F16B 15/06; Y10T 29/49629; Y10T 29/49947
See application file for complete search history.

(56) References Cited

U.S. PATENT DOCUMENTS 3,022,701 A * 2/1962 Potruch ................. F16B 13/126 411/80.1
4,395,174 A * 7/1983 Freeman ................. F16B 15/06 411/510

(Continued)

FOREIGN PATENT DOCUMENTS

CH 184052 A 5/1936
CN 101375066 A 2/2009

(Continued)

OTHER PUBLICATIONS

International Searching Authority, International Search Report in International Application No. PCT/EP2022/082254, mailed Feb. 16, 2023.

(Continued)

*Primary Examiner* — Jason L Vaughan
(74) *Attorney, Agent, or Firm* — Leydig, Voit & Mayer, Ltd.

(57) ABSTRACT

In a method for fastening a component, a nail having a nail shank and a nail head is provided, a sleeve is arranged on the nail shank, a driving-in element and a guide channel are provided, the nail head and the sleeve are arranged in the guide channel such that a peripheral gap is formed between the nail head and the guide channel, the driving-in element is driven through the guide channel toward the nail head in order to move the nail in a driving-in direction toward the substrate, the sleeve is compressed between the nail shank, the guide channel and the nail head while the nail moves toward the substrate, and a preload is applied to the sleeve by means of the nail head.

7 Claims, 3 Drawing Sheets

(56) References Cited

U.S. PATENT DOCUMENTS

| | | | | | |
|---|---|---|---|---|---|
| 4,662,808 | A * | 5/1987 | Camilleri | F16B 13/12 411/394 |
| 5,054,983 | A | 10/1991 | Froewis | |
| 5,171,118 | A * | 12/1992 | Rothenbuhler | E04B 1/762 411/533 |
| 5,607,272 | A * | 3/1997 | Olvera | E04D 3/3603 411/533 |
| 5,611,474 | A * | 3/1997 | Schmidle | B25C 1/188 411/441 |
| 5,660,015 | A * | 8/1997 | Kluser | E04B 1/7629 52/410 |
| 5,833,420 | A * | 11/1998 | Schmidle | E04B 1/7633 411/533 |
| 7,320,179 | B2 * | 1/2008 | Tiemann | E04B 1/7633 29/897.3 |
| 8,375,549 | B2 | 2/2013 | Draht et al. | |
| 8,763,332 | B2 | 7/2014 | Shadwell | |
| 9,435,366 | B2 | 9/2016 | Draht et al. | |
| 10,215,211 | B2 | 2/2019 | Hasegawa | |
| 2013/0008009 | A1 | 1/2013 | Draht et al. | |
| 2018/0017092 | A1 | 1/2018 | Hasegawa | |
| 2020/0224694 | A1 * | 7/2020 | Miescher | F16B 13/045 |
| 2021/0245346 | A1 | 8/2021 | Rosenbaum et al. | |

FOREIGN PATENT DOCUMENTS

| | | | |
|---|---|---|---|
| CN | 107407312 | A | 11/2017 |
| DE | 3107403 | A1 | 2/1982 |
| EP | 0 420 799 | A2 | 4/1991 |
| JP | H03119234 | A | 5/1991 |
| JP | 2000199044 | A | 7/2000 |
| JP | 2003156020 | A | 5/2003 |
| JP | 2020012337 | A | 1/2020 |
| WO | WO 2020-011602 | A1 | 1/2020 |

OTHER PUBLICATIONS

International Searching Authority, Written Opinion in International Application No. PCT/EP2022/082254, mailed Feb. 16, 2023.

* cited by examiner

METHOD AND DEVICE FOR FASTENING A COMPONENT TO A SUBSTRATE

CROSS-REFERENCE TO RELATED APPLICATIONS

This patent application is the U.S. National Stage of International Patent Application No. PCT/EP2022/082254, filed Nov. 17, 2022, which claims the benefit of European Patent Application No. 21211270.0, filed Nov. 30, 2021, which are each incorporated by reference.

The present invention relates to a method and a device for fastening a layered component to a substrate.

It is required in the building sector for an insulating material as an in particular layered component to be fastened to walls or ceilings of buildings as a substrate. The insulating material generally serves as thermal insulation for the wall or ceiling of the building and is fastened on the outer side of the wall or ceiling. For this purpose, fastening elements are fastened by setting elements, for example nails, to the wall or ceiling. The fastening elements made of plastic comprise a hollow shaft and a disk which bears on an outer side of the insulating material after fastening, the shaft being arranged within a through-hole in the insulating material. The hollow shaft comprises a shaft bottom having a passage for the setting element, with the result that the fastening element can be indirectly fastened by means of the setting element to the setting object.

To drive the setting element into the substrate, use is made of a setting device having a driving-in element, which is guided in a guide channel, and a drive for the driving-in element. An amount of energy which the drive applies to the driving-in element is customarily tailored to the setting element, the fastening element and the substrate, wherein excess energy is at least to some extent dissipated in the fastening element and/or in the setting device, and the fastening element or the setting device is mechanically loaded and damaged under certain circumstances.

The object of the present invention consists in providing a fastening method and a fastening device in which sealing between a setting element or nail and a fastening element is improved.

The object is achieved in a method for fastening a component to a substrate in which a nail having a nail shank and a nail head is provided, wherein the nail head has a head diameter which projects beyond the nail shank, a sleeve is arranged on the nail shank, a driving-in element and a guide channel are provided, wherein the guide channel has an inside diameter which exceeds the head diameter, the nail head and the sleeve are arranged in the guide channel such that a peripheral gap is formed between the nail head and the guide channel, the driving-in element is driven through the guide channel toward the nail head in order to move the nail in a driving-in direction toward the substrate, the sleeve is compressed between the nail shank, the guide channel and the nail head while the nail moves toward the substrate, and a preload is applied to the sleeve by means of the nail head. As a result, the nail head bears against the sleeve, and therefore sealing between the nail and the sleeve is improved. The component preferably comprises an insulating material and/or the substrate preferably comprises a wall or ceiling of a building. A diameter of the nail head is preferably larger than an outside diameter of the sleeve.

An advantageous embodiment is characterized in that the sleeve is plastically deformed during the compression between the nail shank, the guide channel and the nail head.

An advantageous embodiment is characterized in that the sleeve completely fills a cavity between the nail shank, the guide channel and the nail head during the compression between the nail shank, the guide channel and the nail head.

An advantageous embodiment is characterized in that a fastening element is provided, having a disk for holding the component, a hollow shaft which projects from the disk and which has a shaft bottom, wherein the shaft bottom preferably has a passage for the nail shank, and the sleeve, wherein the sleeve projects from the shaft bottom, wherein the guide channel is inserted into the hollow shaft until the guide channel bears against the shaft bottom and the sleeve is arranged in the guide channel.

An advantageous embodiment is characterized in that a power-operated setting device is provided, having the guide channel, the driving-in element and a drive for the driving-in element, wherein the guide channel projects beyond the driving-in element in all positions of the driving-in element in the driving-in direction.

The object is likewise achieved by a device for fastening a component to a substrate, preferably a metal substrate, the device comprising a nail having a nail shank and a nail head, wherein the nail head has a head diameter which projects beyond the nail shank, and wherein the nail shank has a preloading element which is intended for applying a preloading force to the nail shank when the nail is driven into the substrate, and comprising a fastening element having a disk for holding the component, a hollow shaft which projects from the disk and which has a shaft bottom, wherein the shaft bottom has in particular a passage for the nail shank, and a sleeve, which projects from the shaft bottom and is arranged on the nail shank.

An advantageous embodiment is characterized in that the preloading element comprises a barb, preferably a multiplicity of barbs, arranged on an outer circumference of the nail shank. The multiplicity of barbs is preferably arranged in rows spaced apart by grooves. As a particular preference, the grooves are inclined relative to a longitudinal direction of the nail shank by an angle of inclination between 4° and 8°.

An advantageous embodiment is characterized in that the sleeve consists substantially of plastic, preferably thermoplastic.

An advantageous embodiment is characterized in that the nail, the driving-in element and/or the guide channel consist/consists substantially of a metal or an alloy, preferably steel. The preloading element preferably comprises a material which has a greater material hardness than a material of the rest of the nail shank. As a particular preference, the preloading element comprises an alloy containing zinc and nickel.

Exemplary embodiments of the invention will be described in more detail below with reference to the appended drawings, In the drawing.

Figure 1:
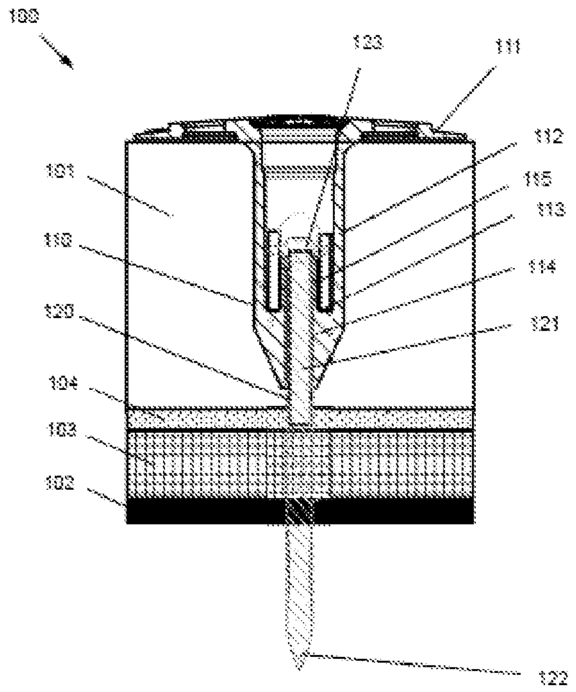
FIG. 1 shows a longitudinal section through a fastening device.

FIG. 1 illustrates a longitudinal section through a fastening device 100 for fastening a component 101, such as, for example, an insulating element, to a metal substrate 102, such as, for example, a steel beam or a frame element of a wall or ceiling of a building. In the exemplary embodiment shown, cladding 103 and a covering film 104 are arranged between the substrate 102 and the component 101. The fastening device 100 comprises a fastening element 110 and a nail 120.

The fastening element 110 has a disk 111 for holding the component 101 against the substrate 102, a hollow shaft 112, which projects from the disk 111 and which has a shaft bottom 113, and a sleeve 115, which projects from the shaft bottom 113. The shaft bottom 113 has a passage 114 for the nail 120. The sleeve 115, preferably the entire fastening element 110, consists substantially of a thermoplastic.

The nail 120 comprises a nail shank 121 with a nail point 122, in particular a conical nail point, and a nail head 123 having a head diameter which projects beyond the nail shank 121. The nail 120 is arranged in the passage 114 such that the sleeve 115 rests against the nail shank 121 and surrounds the nail shank 121. A diameter of the nail head 123 is larger than an outside diameter of the sleeve 115. The nail 120 consists substantially of steel.

Figure 2:
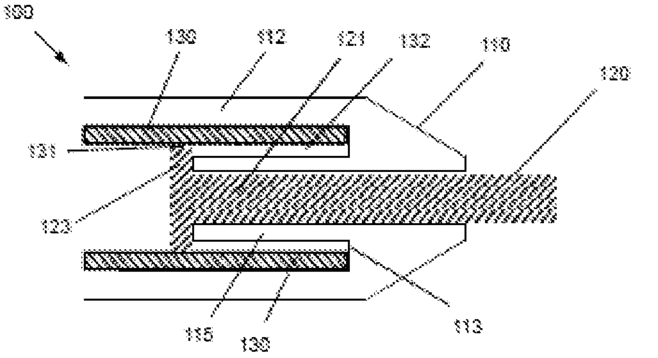
FIG. 2 shows a detail of a fastening device during a fastening process in a longitudinal section.
Figure 3:
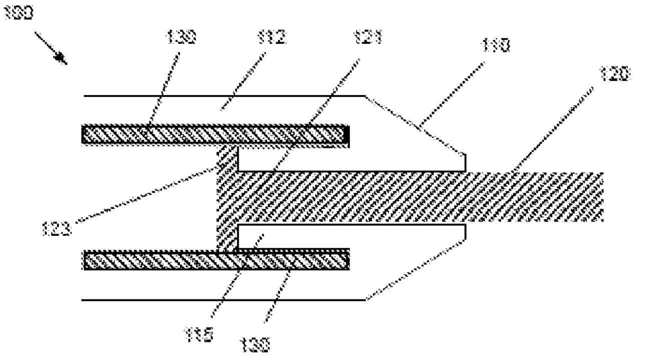
FIG. 3 shows the detail of the fastening device from FIG. 2 in a longitudinal section following the completion of the fastening process.

FIG. 2 and FIG. 3 show a detail of the fastening device 100 during fastening to the substrate. In order to carry out the fastening method, a guide channel 130 of a power-operated nail setting tool (not shown specifically) is first of all introduced into the hollow shaft 112 of the fastening element 110 until the guide channel 130 rests against the shaft bottom 113 and the sleeve 115 is arranged in the guide channel 130. (FIG. 2). A cavity 132 is formed here between the nail shank 121, the guide channel 130 and the nail head 123, in which cavity the sleeve 115 is situated. An inside diameter of the guide channel 130 exceeds the head diameter, such that the nail 120 is guided in the guide channel 130 when the nail head 123 and the sleeve 115 are arranged in the guide channel 130. A peripheral gap 131 is formed between the nail head 123 and the guide channel 130.

In a subsequent step (FIG. 3), a driving-in element of the nail setting tool is driven through the guide channel toward the nail head 123 in order to move the nail 120 in a driving-in direction toward the substrate and to drive it into the substrate (to the right in FIGS. 2-3). Here, the driving-in element consists, for example, of a steel plunger having a plunger diameter which is somewhat smaller than the head diameter of the nail head 123.

While the nail is moving toward the substrate, the sleeve 115 is compressed and, in particular, plastically deformed between the nail shank 121, the guide channel 130 and the nail head 123. During this process, the sleeve 115 completely fills a cavity 132 between the nail shank 121, the guide channel 130 and the nail head 123. A preload is then applied to the sleeve 115 by means of the nail head 123, thus ensuring that the nail head 123 rests firmly against the sleeve 115 and the sleeve 115 rests firmly against the nail shank 121. For this purpose, the nail 120 has a preloading element, as will be explained below. This makes it more difficult for water to penetrate between the nail 120 and the fastening element 110.

Figure 4:
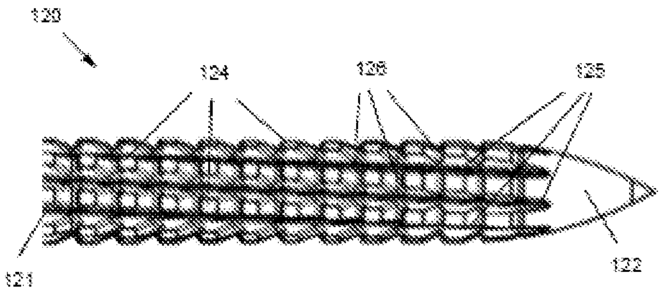
FIG. 4 shows a detail of a nail in a side view.
Figure 5:
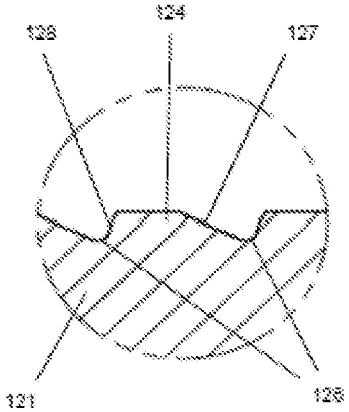
FIG. 5 shows the detail of the nail from FIG. 4 in a longitudinal section.

FIG. 4 and FIG. 5 each show a detail of the nail 120. The nail 120 has a multiplicity of preloading elements 124, which are intended to apply a preloading force to the nail shank 121 when the nail 120 is driven into the substrate. For this purpose, the preloading elements 124 are designed as barbs, which are separated from one another by longitudinal grooves 125 and transverse grooves 126. A depth of the longitudinal grooves 125 and/or of the transverse grooves 126 is at least 5% of a shank diameter of the nail shank 121. The preferably at least four longitudinal grooves 125 are inclined helically by an angle of inclination of 6° with respect to a longitudinal direction of the nail shank 121 and extend into the nail tip 122. A distance between in each case two adjacent transverse grooves 126 is preferably less than or equal to a thickness of the substrate.

Each preloading element 124 has a preferably conical front flank 127, which is directed toward the nail tip 122 (to the right in FIGS. 4-5), and a preferably conical rear flank 128, which is directed toward the nail head (to the left in FIGS. 4-5). A front flank angle between the front flank 127 and the longitudinal direction of the nail shank 121 is smaller (for example between 10° and 30°) than a rear flank angle between the rear flank 128 and the longitudinal direction of the nail shank 121 (for example between 60° and 90°, preferably between 80° and 90°).

At least on their surface, the preloading elements 124 comprise a material with a high material hardness, which is preferably greater than a material hardness of the rest of the nail shank 121 and/or of the substrate. For this purpose, the preloading elements 124 comprise an alloy containing zinc and nickel, preferably in the form of a coating of the nail shank 121.

When the nail 120 is driven into the substrate, a material of the substrate is deformed into the longitudinal grooves 125 and the transverse grooves 126 in such a way that it bears against the front flank 127 and the rear flank 128 of the preloading elements 124. Since this deformation of the substrate material is partially elastic, the substrate exerts forces on the preloading elements 124, and these forces differ on account of the different flank angles for the front flank 127 and the rear flank 128. The steeper a flank, the greater the force component in the longitudinal direction of the nail shank 121. This results in a preloading force toward the nail tip 122 along the longitudinal direction of the nail shank 121, exerted on the nail 120 by the substrate. The nail 120 transmits this preloading force to the sleeve 115 by means of the nail head 123 (FIG. 1), and therefore an improved sealing effect of the sleeve 115 can be achieved even in the case of a thermoplastic sleeve material.

The invention has been described using the example of a method and a device for fastening in particular an insulating material to a wall or ceiling of a building. However, it should be noted that the invention is also suitable for other purposes.

The invention claimed is:

1. A method for fastening a component, the method comprising:
- providing a nail having a nail shank and a nail head, wherein the nail head has a head diameter which projects beyond the nail shank,
- arranging a sleeve on the nail shank,
- providing a fastening element, having a disk for holding the component, a hollow shaft which projects from the disk and which has a shaft bottom, wherein the sleeve projects from the shaft bottom,
- providing a driving-in element and a guide channel, wherein the guide channel has an inside diameter which exceeds the head diameter,
- inserting the guide channel into the hollow shaft until the guide channel bears against the shaft bottom and the sleeve is arranged in the guide channel,
- arranging the nail head and the sleeve in the guide channel such that a peripheral gap is formed between the nail head and the guide channel,
- driving the driving-in element through the guide channel toward the nail head in order to move the nail in a driving-in direction toward the substrate, compressing the sleeve between the nail shank, the guide channel and the nail head while the nail moves toward the substrate, and applying a preload to the sleeve by the nail head.

2. The method as claimed in claim 1, wherein a diameter of the nail head is larger than an outside diameter of the sleeve.

3. The method as claimed in claim 1, including physically deforming the sleeve plastically during the compression between the nail shank, the guide channel and the nail head.

4. The method as claimed in claim 1, wherein the sleeve completely fills a cavity between the nail shank, the guide channel and the nail head during the compression between the nail shank, the guide channel and the nail head.

5. The method as claimed in claim 1, further comprising:

providing a power-operated setting device, having the guide channel, the driving-in element and a drive for the driving-in element, wherein the guide channel projects beyond the driving-in element in all positions of the driving-in element in the driving-in direction.

6. The method of claim 1, comprising fastening an insulating material to a wall or ceiling of a building.

7. The method of claim 1, wherein the shaft bottom has a passage for the nail shank and the sleeve.

* * * * *